US009509368B2

(12) United States Patent
Wahibi et al.

(10) Patent No.: US 9,509,368 B2
(45) Date of Patent: Nov. 29, 2016

(54) METHOD AND DEVICE FOR DETERMINING A PARAMETER THAT CHARACTERIZES A NUMBER OF SPARE POSITIONS TO BE USED FOR CANCELLING THE CROSSTALK OF LINES JOINING A DIGITAL SUBSCRIBER LINE VECTORING GROUP

(71) Applicant: Alcatel Lucent, Paris (FR)

(72) Inventors: Issam Wahibi, Antwerp (BE); Benoît Drooghaag, Namur (BE)

(73) Assignee: Alcatel Lucent, Boulogne-Billancourt (FR)

( * ) Notice: Subject to any disclaimer, the term of this patent is extended or adjusted under 35 U.S.C. 154(b) by 47 days.

(21) Appl. No.: 14/407,444

(22) PCT Filed: Jul. 24, 2013

(86) PCT No.: PCT/EP2013/065619
§ 371 (c)(1),
(2) Date: Dec. 11, 2014

(87) PCT Pub. No.: WO2014/032870
PCT Pub. Date: Mar. 6, 2014

(65) Prior Publication Data
US 2015/0155914 A1    Jun. 4, 2015

(30) Foreign Application Priority Data
Aug. 30, 2012 (EP) .................................. 12306034

(51) Int. Cl.
*H04B 3/34* (2006.01)
*H04B 3/32* (2006.01)
(Continued)

(52) U.S. Cl.
CPC ...... *H04B 3/34* (2013.01); *H04B 3/32* (2013.01); *H04B 3/487* (2015.01); *H04M 3/18* (2013.01); *H04M 3/34* (2013.01)

(58) Field of Classification Search
CPC ....................................................... H04B 3/34
See application file for complete search history.

(56) References Cited

U.S. PATENT DOCUMENTS

2009/0046568 A1* 2/2009 Xu .................... H04L 25/03343
370/201
2009/0257581 A1* 10/2009 Biyani ................ H04L 27/2647
379/417

(Continued)

FOREIGN PATENT DOCUMENTS

CN    102301612 A    12/2011
CN    102388588 A     3/2012

(Continued)

OTHER PUBLICATIONS

International Search Report PCT/ISA/210 for International Application No. PCT/EP2013/065619 Dated Aug. 21, 2013.

(Continued)

*Primary Examiner* — Brian D Nguyen
*Assistant Examiner* — Toan Nguyen
(74) *Attorney, Agent, or Firm* — Harness, Dickey & Pierce, P.L.C.

(57) ABSTRACT

The method and a device determine a parameter that characterizes a number of spare positions to be used for cancelling the crosstalk of lines joining a digital subscriber line vectoring group. The vectoring includes cancelling the crosstalk caused by a maximum number of lines of the vectoring group and reserving the number of spare positions. In order to provide a method and a device for determining a number of spare positions such that the vectoring group operates efficiently, the method includes determining a residual crosstalk metric that depends on a residual crosstalk between at least two subscriber lines of the vectoring group; and determining the parameter that characterizes the number of spare positions depending on the at least one residual crosstalk metric by successively modifying the parameter until the residual crosstalk metric fulfills a termination condition.

9 Claims, 5 Drawing Sheets

(51) Int. Cl.
*H04M 3/18* (2006.01)
*H04M 3/34* (2006.01)
*H04B 3/487* (2015.01)

(56) References Cited

U.S. PATENT DOCUMENTS

| | | | | |
|---|---|---|---|---|
| 2012/0027060 A1* | 2/2012 | Singh | ............... | H04B 3/487 375/222 |
| 2012/0195183 A1* | 8/2012 | Nuzman | ............... | H04B 7/0848 370/201 |
| 2013/0229905 A1* | 9/2013 | Schenk | ............... | H04B 3/32 370/201 |

FOREIGN PATENT DOCUMENTS

| | | |
|---|---|---|
| EP | 2383899 A1 | 11/2011 |
| EP | 2466757 A1 | 6/2012 |
| WO | WO-2010019486 A2 | 2/2010 |
| WO | WO-2012080064 A1 | 6/2012 |

OTHER PUBLICATIONS

Written Opinion of the International Searching Authority PCT/ISA/237 for International Application No. PCT/EP2013/065619 dated Aug. 21, 2013.

* cited by examiner

METHOD AND DEVICE FOR DETERMINING A PARAMETER THAT CHARACTERIZES A NUMBER OF SPARE POSITIONS TO BE USED FOR CANCELLING THE CROSSTALK OF LINES JOINING A DIGITAL SUBSCRIBER LINE VECTORING GROUP

FIELD OF THE INVENTION

The present invention refers to a method for determining a parameter that characterizes a number of spare positions to be used for cancelling the crosstalk of lines joining a digital subscriber line vectoring group, the vectoring comprising cancelling the crosstalk caused by a maximum number of lines of the vectoring group and reserving said number of spare positions. In addition, the invention refers to a respective device for determining said parameter, a monitoring node, an access node for a wire line access network, and a computer program product programmed for executing such a method.

BACKGROUND

It is known to apply a crosstalk cancellation technique, also referred to as "vectoring" to a group of telecommunication lines such as Digital Subscriber Lines (DSL). Vectoring is described in detail in the ITU-T Recommendation G.993.5. Vectoring allows for cancelling the crosstalk internal to a group of lines (vectoring group) or so called in-domain Far-End Crosstalk (FEXT), which is a major limitation to achieve high bitrates over lines that extend within a common cable or binder. Thus, vectoring increases significantly the available bit rate on such lines.

In order to limit the signal processing overhead caused by vectoring, typically a sub-group of a vectoring group is included in the crosstalk cancelling. That is, an arrangement for crosstalk cancelling according to the vectoring approach typically can cancel the crosstalk for a maximum number of disturbing lines of the vectoring group. As a consequence, there may be some lines in a vectoring group the crosstalk caused by which lines is not cancelled. Limiting the number of lines of the vectoring group that are included into crosstalk cancellation to a maximum number that is less than a total number of lines of the vectoring group is referred to as partial crosstalk cancellation. Partial crosstalk cancellation has less signal processing overhead than full crosstalk cancellation, which includes all lines of a vectoring group into crosstalk cancellation. Partial crosstalk cancellation is often applied for large vectoring groups which may be present in System Level Vectoring (SLV) covering many lines that are usually connected to multiple line cards of an access node.

It is known to define a number of spare positions within the maximum number of disturbing lines so that telecommunication lines that will join the vectoring group can initially be assigned to these spare positions. After a certain time, these spare positions will be freed again. Consequently, the number of disturbing lines the crosstalk of which is cancelled, is less than the supported maximum number. Typically, the number of spare positions can be configured by an operator of a DSL access network.

SUMMARY

The object of the present invention is to provide a method and a device for determining a number of spare positions such that the vectoring group operates efficiently.

If the number of spare positions is too low then a so called group join of telecommunication lines to a vectoring group (join of multiple lines to be added to the vectoring group) is time consuming because the maximum number of lines that can be included in the vectoring group depends on the number of free spare positions. If there are not enough free positions then the group join must be split into two consecutive group joins. If the number of spare positions is too high then there is a risk that an insufficient number of disturbing lines is included into crosstalk cancelling and the bit rate of the lines is too low.

Furthermore, the invention aims at detecting a high level of crosstalk that is caused by lines that are not part of the vectoring group (so called alien noise or alien crosstalk).

According to an embodiment of the invention, a method for determining a parameter that characterizes a number of spare positions to be used for cancelling the crosstalk of lines joining a digital subscriber line vectoring group is provided, the vectoring comprising cancelling the crosstalk caused by a maximum number of lines of the vectoring group and reserving said number of spare positions, wherein the method comprises estimating a residual crosstalk metric that depends on a residual crosstalk between at least two subscriber lines of the vectoring group; and determining said parameter that characterizes the number of spare positions depending on the at least one residual crosstalk metric. Residual crosstalk is the crosstalk caused by disturbing lines that belong to the vectoring group but are not included into crosstalk cancellation.

By determining the parameter depending on the residual crosstalk, a value of the parameter that allows to cancel the crosstalk sufficiently, can be found and reserving an unnecessary low number of spare positions is avoided. Thus, high bit rates can be achieved on the telecommunication lines of the vectoring group and group joins to the vectoring group can be processed as fast as possible.

In an embodiment, the method comprises successively modifying the parameter until the residual crosstalk metric fulfils a termination condition. Preferably, the parameter may be modified until the crosstalk metric reaches or exceeds a predefined threshold.

In an embodiment, the method comprises successively incrementing the parameter until the residual crosstalk metric fulfils a first predefined termination condition. For example, the first predefined termination condition may correspond to the residual crosstalk metric reaching or exceeding the predefined threshold or residing within a predefined range.

In an embodiment, the method comprises successively decrementing the parameter until the residual crosstalk metric fulfils a second predefined termination condition. For instance, the second predefined termination condition may correspond to the residual crosstalk metric reaching or exceeding a further predefined threshold or residing within a further predefined range.

In a preferred embodiment, the method comprises checking whether or not the residual crosstalk metric is less than a predefined residual crosstalk threshold and depending on the result of said checking either successively incrementing the parameter until the residual crosstalk metric fulfills the first predefined termination condition or successively decrementing the parameter until the residual crosstalk metric fulfills the second predefined termination condition. In an exemplary embodiment, the parameter is successively incremented until the residual crosstalk metric fulfills the first predefined termination condition if the residual crosstalk metric is less than the predefined residual crosstalk threshold; otherwise the parameter is successively decremented until the residual crosstalk metric fulfils the second predefined termination condition.

In an embodiment, the residual crosstalk metric is determined depending on at least one crosstalk ratio of a certain line, the crosstalk ratio corresponding to a ratio of the crosstalk caused by the lines of the vectoring group that are not included into crosstalk cancellation to the crosstalk caused by all lines of the vectoring group. For instance, the crosstalk between two lines of the vectoring group may be determined by acquiring at least a part of a crosstalk matrix from a device (e.g. access node or DSL modem) connected to one of the telecommunication lines. A coefficient of the crosstalk matrix describes a crosstalk transfer function of the crosstalk between two specific lines. The coefficients of the crosstalk matrix are therefore also referred to as crosstalk coefficients.

In an embodiment, the crosstalk metric is a maximum value or a mean value of the crosstalk ratio of multiple lines of the vectoring group, preferably of all lines of the vectoring group.

Furthermore, in an embodiment, the method comprises determining a noise level metric for at least one subscriber line, the noise level metric depending on the noise level at the at least one subscriber line.

The method may comprises acquiring line measurement data from at least one device connected to one of the telecommunication lines and calculating the noise level metric depending on the acquired line measurement data. The data acquired from the device connected to at least one of the telecommunication lines may include Quiet Line Noise (QLN) level or data characterizing a transfer function of a telecommunication line such as Hlog data. Preferably, the metric may be a number of disturbers parameter, which may be calculated e.g. by fitting a mathematical model of the noise level to the line measure data. An exemplary fitting approach for calculating the number of disturbers is described in EP 2 383 899 A1. However, the invention is not limited to the number of disturbers metric or to a specific approach on how to calculate this metric. In other embodiments, other metrics may be used as the noise level metric.

In an embodiment, the method comprises detecting that the at least on subscriber line is subject to alien crosstalk depending on the noise level metric, preferably if the noise level metric is greater than a predefined noise level threshold. Using the noise level metric only, does not allow reliably detecting alien crosstalk. However, when considering both the residual crosstalk metric as well as the noise level metric, alien crosstalk can be distinguished from noise originating from crosstalking lines that belong to the vectoring group and alien crosstalk (also referred to as "alien noise") can be quite reliably detected.

According to another embodiment, a device, e.g. a controller, computer, etc., for determining a parameter that characterizes a number of spare positions to be used for cancelling the crosstalk of lines joining a digital subscriber line vectoring group is provided, the vectoring comprising cancelling the crosstalk caused by a maximum number of lines of the vectoring group and reserving said number of spare positions, wherein the device is arranged for determining a residual crosstalk metric that depends on a residual crosstalk between at least two subscriber lines of the vectoring group; and determining said parameter that characterizes the number of spare positions depending on the at least one residual crosstalk metric.

In an embodiment, the device is arranged, preferably programmed, for executing a method according to the invention, embodiments of which methods are herein described.

According to yet another embodiment, a monitoring node comprising a communication interface for connecting the monitoring node to an access network, the access network including at least one device connected to one of the telecommunication lines is provided, wherein the monitoring node comprises the device for determining a parameter that characterizes a number of spare positions. In an embodiment, the monitoring node or the device for determining a parameter that characterizes the number of spare positions may be part of a network analyzer. In particular, the monitoring node or said device for determining the parameter may be integrated in a Dynamic Line Management (DLM) system. Furthermore, a DLM system may be provided that is operable for executing the method according to the invention, embodiments of which method are herein described. Integrating the device or method for determining the parameter in the DLM system allows automatically modifying the parameter while operating the telecommunication lines connected to an access node.

According to still another embodiment, an access node for multiple telecommunication lines, preferably a DSLAM, is provided the access node comprising the device for determining a parameter that characterizes a number of spare positions.

According to a further embodiment, a computer program product, preferably a computer readable storage medium, is provided, the computer program product comprising a computer program that is programmed for executing a method according to the invention, embodiments of which methods are herein described. The storage medium may comprise magnetic, optical or semiconductor memory.

BRIEF DESCRIPTION OF THE FIGURES

Exemplary embodiments and further advantages of the present invention are shown in the Figures and described in detail hereinafter.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
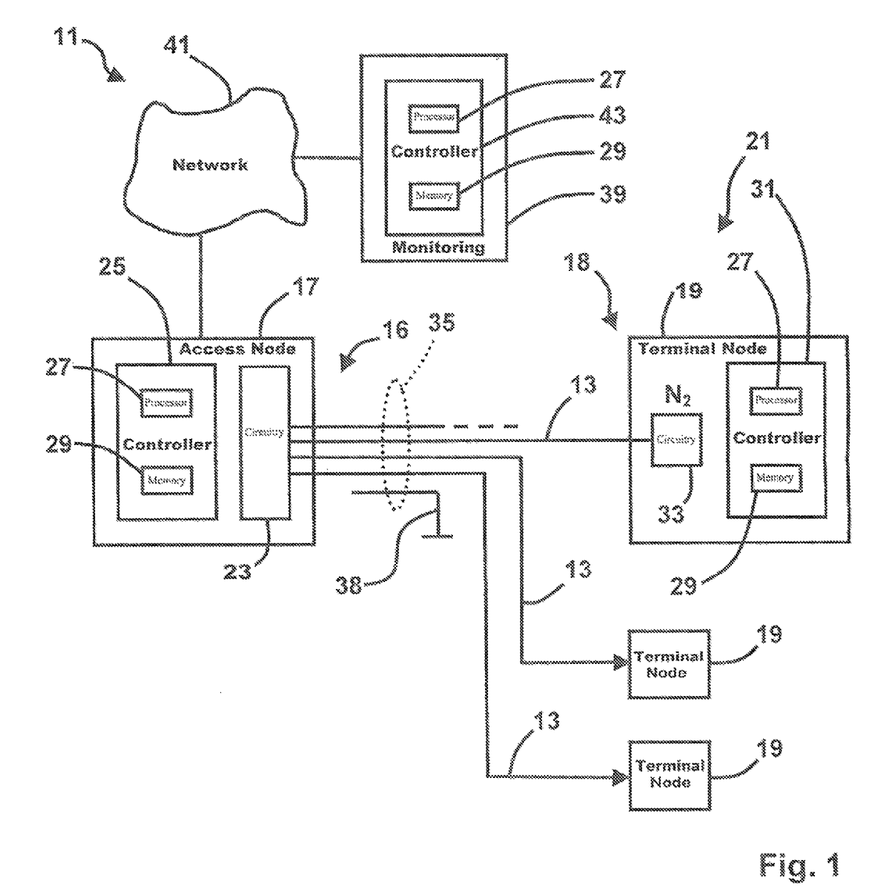
FIG. 1 shows a communication network.

FIG. 1 shows a communication network 11 comprising telecommunication lines 13. At least one telecommunication line 13 has a pair of electrical conductors. A first end 16 of the line 13 is connected to a network side termination node of the network 11, further referred to as access node 17, and a second end 18 of the line 13 is connected to a terminal side termination node 19 of the network 11. The terminal side termination node 19 may be part of customer premises equipment (CPE 21) of the network 11.

In the shown embodiment, the telecommunication line 13 is a Digital Subscriber Line (DSL), such as an ADSL, a VDSL or the like. Consequently, the access node 17 may be a DSL Access Multiplexer (DSLAM) or another type of DSL access node. The terminal side termination node 19 may be a DSL modem or include a DSL modem. However, the present invention is not limited to DSL. In another embodiment, the network 11 comprises a different type of telecommunication line 13.

The access node 17 has first modem circuitry 23 to which the first end 16 of the line 13 is connected. In addition, the access node 17 has a first controller 25 adapted for controlling the operation of the access node 17. In an embodiment, the first controller 25 is a programmable computer comprising a processor 27, e. g. a microprocessor, and a storage element 29, e.g. semiconductor memory.

The terminal side termination node 19 includes second modem circuitry 33 to which the second end 18 of the line 13 is connected. Furthermore, the terminal side termination node 19 comprises a second controller 31. The second controller 31 may have the same basic configuration as the first controller 25, i.e. the second controller 31 may be a programmable computer and comprise a processor 27 and/or a storage element 29.

In the shown embodiment, at least some lines 13 are part of a binder 35 and extend in parallel to each other. The binder 35 may comprise an electrically conductive, preferably metallic, shielding 38 that may be grounded as depicted in FIG. 1.

Furthermore, the network 11 may comprise an optional monitoring station 39 connected e. g. via an interconnection network 41 to at least one of the nodes 17, 19 such that the station 39 can communicate with at least one of the nodes 17, 19, preferably the access node 17. The station 39 comprises a third controller 43. The third controller 43 may have the same basic configuration as the first controller 25, i.e. the third controller 43 may be a programmable computer and comprise a processor 27 and/or a storage element 29. In an exemplary embodiment, the station 39 may be a server computer, a personal computer, a handheld computer such as a PDA or cell phone, etc.

At least one of the controllers 25, 31, or 43 is arranged for executing a method for determining a parameter that characterizes a number of spare positions to be used for cancelling the crosstalk of lines joining a digital subscriber line vectoring group. To this end, a computer program may be provided that is programmed such that at least one of the controllers 25, 31, 43 executes the method when running said computer program. In other words, the method may be executed on the access node 17, on the station 39, or the terminal side termination node 19. The computer program may be stored on at least one storage element 29. In addition, the computer program may be stored on any type of data storage media such as magnetic or optical disk or semiconductor storage media. Furthermore, the program can be provided by a server for transmission over a network, preferably the Internet.

Figure 2:
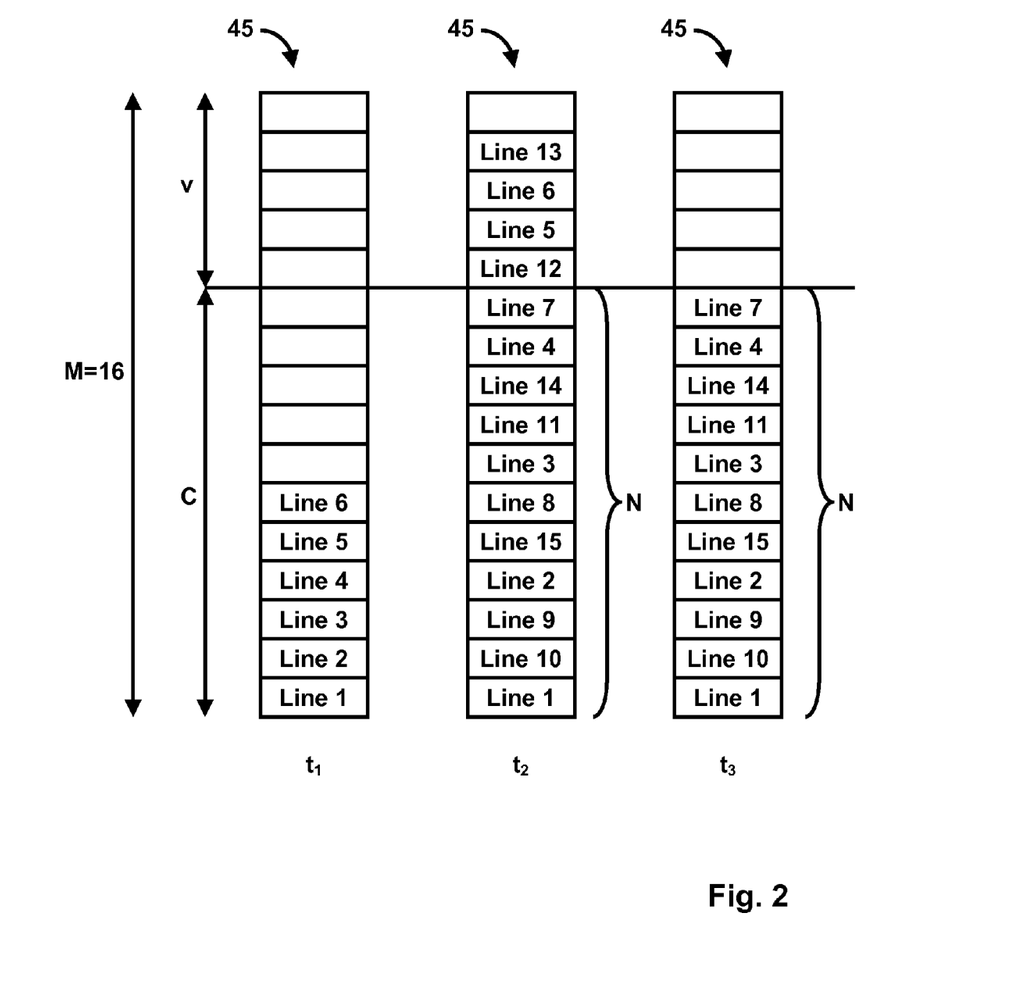
FIG. 2 shows a list of cancelled disturbers of a telecommunication line for different instances of time.

Referring to FIG. 2, the approach of partial crosstalk cancellation is explained in more detail. FIG. 2 shows a list of telecommunication lines that cause crosstalk to a certain telecommunication line 13 is shown for 3 different instants of time, $t_1 < t_2 < t_3$.

At time $t_1$ six telecommunication lines 13 are activated. The remaining lines 13 of the binder 35 are not activated. As a consequence, only lines 1-6 can cause crosstalk. The six activated lines 13 occupy the slots "line 1", line 2", line 3", "line 4", "line 5" and "line 6" in a disturber list 45 shown on the left hand side of FIG. 2. In the shown example, the crosstalk caused by C>6 lines, i.e. the crosstalk caused by all active lines, can be cancelled.

Between time $t_1$ and time $t_2$ a so called group join occurs. That is, a group of telecommunication lines 13 is activated. In the shown example, the lines 13 labelled with "line 7"-"line 13" are activated. Activating a line 13 may be caused by turning on the CPE 21 connected to that line 13. Another reason for activating a line 13 may be that a network operator is unlocking it in the access node 17. These lines 13 have initially no impact on the other lines in the vectoring group before their activation, but after activation they will join the vectoring group because they may generate crosstalk and possibly must be considered when cancelling crosstalk. Consequently, they are included in a disturber list 45.

The disturber list 45 is updated in every vectoring cycle during which the crosstalk coefficients that characterise the crosstalk between the lines 13 of the vectoring group, are estimated. A vectoring cycle starts when lines 13 join or leave the vectoring group, e. g. when they are activated or deactivated. In addition, the network 11, in particular the access node 17, may be configured such that a vectoring tracking mode is activated. When the vectoring tracking mode is activated, new vectoring cycles are started periodically, e. g. every minute, and the crosstalk coefficients are estimated periodically.

By analysing the estimated crosstalk coefficients, the disturbing lines may be ordered according the extent of crosstalk they cause to a certain telecommunication line 13. The disturber list 45 in the middle of FIG. 2 refers to instant $t_2$ when the additional lines have joined the vectoring group, the crosstalk coefficients have been estimated and the lines have been ordered according to the extent of crosstalk. The most dominant disturbing line 13 is in the bottom of the list (line 1) and the less dominant disturbing line is in the top of the list (line 13).

A vectoring group is a set of lines 13 over which transmission is eligible to be subject to crosstalk cancelling. For instance, when performing system level vectoring (SLV), the vectoring group may comprise all active telecommunication lines connected to a single access node 17. However, the access node 17, having limited signal processing resources, supports a maximum number M of disturbing lines 13 that crosstalk of which affecting a certain (victim) line 13 can be cancelled. At least in some cases (e.g. if a certain number of lines 13 is activated) a total number N of lines 13 belonging to the vectoring group is greater than the number of lines that can be cancelled, i.e. included into crosstalk cancellation. That is, the access node 17 performs partial crosstalk cancellation. In the shown example, the access node 17 can cancel the crosstalk of at most M=16 lines 13. Thus, in case that there are more than M active lines 13 in the vectoring group, the crosstalk caused by some of the active lines cannot be cancelled. Preferably, the most dominant cross-talkers are included in crosstalk cancellation. When activating a line 13 or a group of lines 13 then the new activated lines 13 are initially included into crosstalk cancellation. In order to be able to initially include these new lines into crosstalk cancellation, a number v of spare positions is reserved within the total number M of lines, the crosstalk of which can be cancelled. Consequently, after a certain number of lines have joined the vectoring group, the access node 17 excludes one or more least dominant disturbing lines from crosstalk cancelling in order to make sure that there are at least v spare positions available again. In the example shown in FIG. 2, the access node 17 has excluded the lines 13 labelled with "line 12", "line 5", "line 6", "line 13" from crosstalk cancelling, as shown in the disturber list 45 for time $t_3$.

Because the parameter v corresponds to the number of lines 13 that may join the vectoring group simultaneously, the parameter v is also referred to as vce-min-par-join (vectoring control entity minimum parallel joining number). This parameter may either be predefined manually, e. g. by a network operator of the network 11, or be determined automatically by means of the method described herein. The parameter v determines the number of disturbing lines 13 that can be permanently included in vectoring. In particular, C=M−v lines can be included into crosstalk cancellation. That is, the higher the parameter v, the less lines 13 can be included into crosstalk cancellation. However, reducing the parameter v decreases the number of activated lines that can join the vectoring group simultaneously. If a size of a group of lines that want to join the vectoring group is greater than v, then the group of joining lines must be split into multiple sub-groups. These sub-groups are then joined one after another. Joining multiple sub-groups is time consuming, because a certain group or sub-group can join the vectoring group only after the access node 17 has freed the number v of spare positions.

Figure 3:
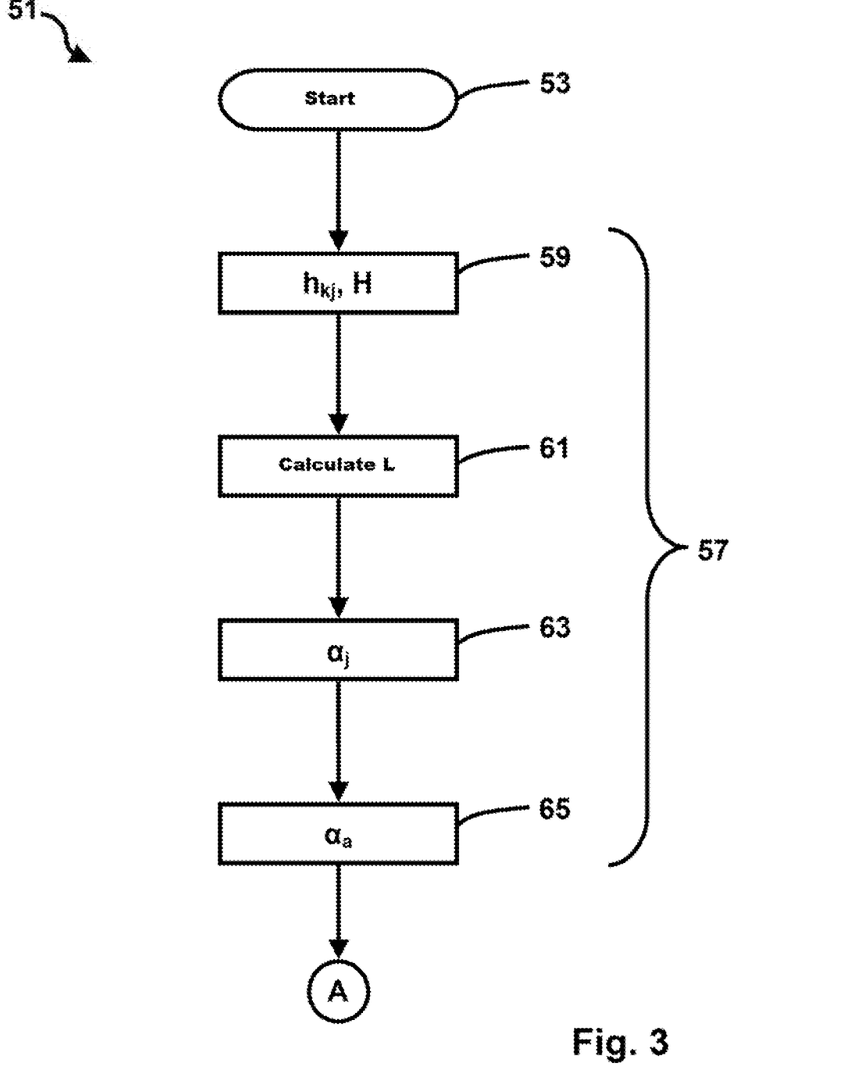
FIGS. 3-5 show a flowchart of a method for determining a number of spare positions for lines joining the a vectoring group.
Figure 4:
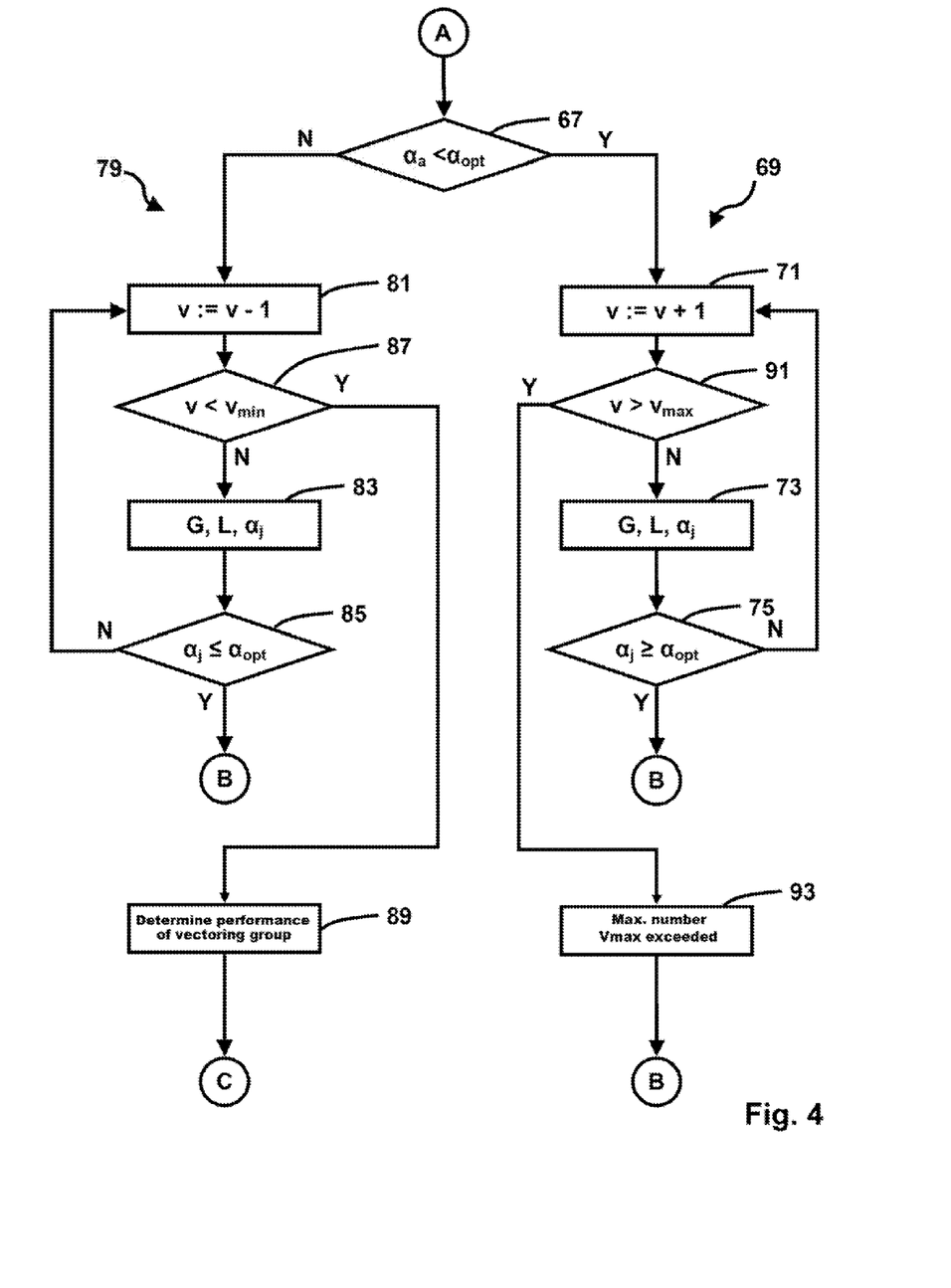
Figure 5:
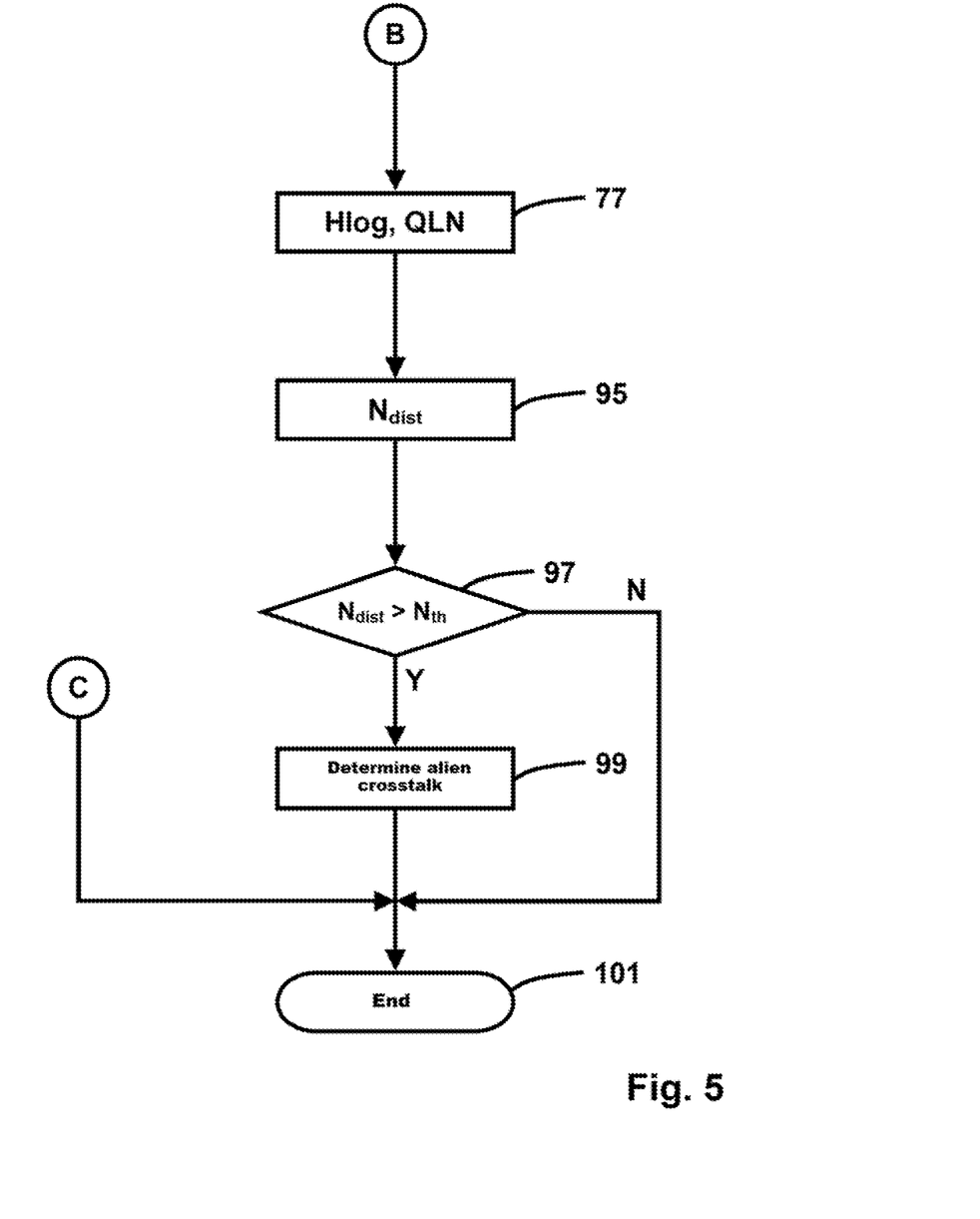

FIGS. 3, 4 and 5 show a flowchart of a method 51 for determining the parameter v that describes the number of spare positions to be used for cancelling crosstalk of additional lines joining the vectoring group. In the shown embodiment, the value of the parameter v is exactly the number of spare positions to be reserved. The method may be executed on the monitoring station 39 which may be part of a network analyser for optimizing the performance of the network 11 and for diagnosis of technical issues in the network 11. In particular, the method 51 may be integrated in a dynamic line management (DLM) system. The method 51 iteratively modifies the parameter v until a residual crosstalk metric $\alpha_a$ reaches an acceptable value and therefore allows to automatically configure the parameter v for a certain access node 17.

When implemented on the monitoring station 39, the method 51 retrieves data from nodes connected to the communication lines 13, e. g. the access node 17 or the terminal side termination node 19, by using appropriate communication protocols, such as SNMP. These data include information about measurement results performed by the nodes 17, 19 connected to the lines 13, e.g. crosstalk coefficients $h_{kj}$ of a crosstalk matrix H, transfer function data Hlog related to the individual lines 13, and the quiet line noise (QLN). The crosstalk coefficient $h_{kj}$ describes a crosstalk transfer function of the crosstalk from line k to line j. The retrieved data, e.g. the crosstalk matrix H, the crosstalk coefficients $h_{kj}$, the transfer function data Hlog, and/or the QLN, may be frequency dependant and therefore may be represented as frequency dependant vectors.

In an embodiment, the method 51 may be implemented on the access node 17. An access node 17 that can execute the method 51 may include a user interface to be used e.g. by administrative personnel that allows the administrative personnel either to define a fixed value of the parameter v or to let the access node 17 determine the value of the parameter v automatically by means of the method 51.

After a start 53 of the method 51, a group 57 of steps is executed in order to determine a residual crosstalk metric $\alpha_a$ that depends on residual crosstalk between at least two subscriber lines 13 of the vectoring group. A first step 59 of this group—which may executed after the start 53 of the method 51—acquires at least one crosstalk coefficient $h_{kj}$ that characterises a crosstalk transfer function between a telecommunication line i and a telecommunication line j. In an embodiment, step 59 may comprise acquiring the whole crosstalk matrix H including the crosstalk coefficients $h_k$ related to all pairs of communication lines 13 of a vectoring group. If the method 51 is executed by the monitoring station 39, step 59 may use a communication protocol in order to retrieve the crosstalk coefficients $h_k$ or the crosstalk matrix H from the line termination nodes 17, 19, in particular from the access node 17.

After step 59, a step 61 of the group 57 is executed that calculates a list L of the most dominant crosstalkers that are taken into account in the crosstalk cancellation. In a preferred embodiment, this list L is determined a certain time after the last joining of additional lines 13 when the access node 17 has made sure that the minimum number of spare positions v are unused, e. g. in the example of FIG. 2 at instance $t_1$ or $t_3$. In this preferred embodiment, the maximum length of the list L of dominant crosstalkers corresponds to the value C. The list L of dominant crosstalkers may be determined by analysing the crosstalk matrix H, e. g. by comparing the individual crosstalk coefficients $h_{kj}$ with each other.

In the example shown in FIG. 2, at $t_3$ the list of dominant crosstalkers includes the lines L={line 1, line 10, line 9, line 2, line 15, line 8, line 3, line 11, line 14, line 4, line 7}. The disturbing lines that are not part of the list L are line 12, line 5, line 6, and line 13. The total number of disturbing lines is N=15.

After step 61 a step 63 of the group 57 is executed. Step 63 calculates a residual crosstalk ratio $\alpha_j$ as a function of the crosstalk coefficients $h_{kj}$ according to the following equation:

$$\alpha_j = \frac{\sum_{k \in [1:N]} h_{kj} - \sum_{k \in L} h_{kj}}{\sum_{k \in [1:N]} h_{kj}} \quad (1)$$

The residual crosstalk ratio $\alpha_j$ corresponds to the ratio of the crosstalk caused by the lines of the vectoring group that are not included into crosstalk cancellation to the crosstalk caused by all lines of the vectoring group. However, the residual crosstalk ratio does not consider crosstalk caused by lines that are not part of the vectoring group (alien crosstalk). Preferably, the crosstalk ratio $\alpha_j$ is calculated for multiple lines 13, preferably all lines j that belong to the vectoring group.

Then a step 65 of the group 57 calculates the residual crosstalk metric $\alpha_a$. The residual crosstalk metric $\alpha_a$ may be calculated depending on at least one residual crosstalk ratio $\alpha_j$, preferably on all calculated residual crosstalk ratios $\alpha_j$. In an embodiment, the residual crosstalk metric $\alpha_a$ is a maximum value of all crosstalk ratios $\alpha_j$ determined in step 63, i.e.

$$\alpha_a = \max_{j \in [1:N]} \{\alpha_j\} \quad (2)$$

In another embodiment, the residual crosstalk metric $\alpha_a$ is the mean value of the residual crosstalk ratios $\alpha_j$, i.e.

$$\alpha_a = \operatorname*{mean}_{j \in [1:N]} \{\alpha_j\} \quad (3)$$

However, in different embodiments, the residual crosstalk metric $\alpha_a$ may be calculated in a different way.

After the completion of step 65 a branch 67 is executed that checks whether or not the crosstalk metric $\alpha_a$ is less than a predefined residual crosstalk threshold $\alpha_{opt}$ (see FIG. 4). If so (Y) then an incrementing loop 69 is executed that successively increments the parameter v until the residual crosstalk metric fulfils a first predefined termination condition. To this end, a step 71 increments the parameter v, a step 73 recalculates the residual crosstalk metric $\alpha_j$ for the new value of the parameter v. Step 71 may include updating the configuration of the access node 17 with the new value of the parameter v so that the access node 17 reserves the new number v of spare positions. Step 73 may include waiting until a line 13 has been phased out of the set of lines included in crosstalk cancelling in order to reserve an additional spare position (as described above) and perform at least essentially the same step as group 57 in order to calculate an updated value of the residual crosstalk metric $\alpha_a$. Then a branch 75 checks whether the first predefined termination condition is fulfilled. In the shown exemplary embodiment, the first predefined termination condition is $\alpha_a \geq \alpha_{opt}$, i.e. the parameter v is successively incremented until the residual crosstalk metric $\alpha_a$ is greater or equal the threshold $\alpha_{opt}$. If the first termination condition is fulfilled (Y) then the method 51 continues with a step 77 shown in FIG. 5. Otherwise (N), the method 51 returns to step 71.

If the branch 67 detects that the residual crosstalk metric $\alpha_a$ is not less than the predefined residual crosstalk threshold $\alpha_{opt}$ (N) then a decrementing loop 79 is executed, i.e. the parameter v is successively decremented until the residual crosstalk metric $\alpha_a$ fulfils a second predefined termination condition. To this end a step 81 decrements the parameter v, a step 83 recalculates the residual crosstalk metric $\alpha_a$ at least in similar way as step 73. Step 81 may include updating the configuration of the access node 17 with the new value of the parameter v so that the access node 17 reserves the new number v of spare positions. A branch 85 checks whether the second predefined termination condition is fulfilled, if so (Y) then the method 51 continues with step 77, otherwise (N) the method 51 goes back to step 81. The second predefined termination condition is $\alpha_a \leq \alpha_{opt}$, i.e. the parameter v is decremented until the residual crosstalk metric $\alpha_a$ is less or equal than the predefined residual crosstalk threshold $\alpha_{opt}$.

The present invention is not limited to the exemplary first and second predefined termination conditions of branches 75 and 85. In different embodiments, other first and second predefined termination conditions may be selected. For example, the residual crosstalk metric $\alpha_a$ may be compared with different thresholds than the predefined threshold $\alpha_{opt}$ used in branch 67. Furthermore, the values to which the residual crosstalk metric $\alpha_a$ is compared may differ in branches 75 and 85.

In an embodiment, the method 51 may comprise verifying, whether successively increasing or decreasing the parameter v converges. If successively decrementing the parameter v does not converge, the global performance of the vectoring system or the vectoring group is limited by the crosstalk caused by the residual crosstalkers that cannot be cancelled because the maximum number M of disturbers is under-dimensioned. In an embodiment, the method 51 may comprise a branch 87 (e.g. between steps 81 and 83) that checks whether the parameter v has exceeded a minimum value $v_{min}$. If so (Y), a step 89 determines that the performance of the vectoring group is limited by the non-cancelled residual crosstalkers and terminates the method 51.

In case that successively incrementing the parameter v does not converge, the vectoring system is oversized, i.e. it is possible to reserve more spare positions than needed without affecting the crosstalk between the lines 13 and the bit rate on the individual lines 13. If the method 51 detects that successively incrementing the parameter v does not converge then the method may continue with step 77. In an embodiment, the method 51 may include a branch 91 (e.g. between steps 71 and 73) for verifying whether the parameter v is greater than a maximum value $v_{max}$. If so (Y), a step 93 may be executed in order to assert that the maximum number $v_{max}$ has been exceeded and the system is oversized. After step 93 the method 51 may continue with step 77.

In step 77, the method 51 acquires line measurement data such as transfer function data Hlog related to at least one line 13 of the vectoring group, that transfer function data Hlog describing a transfer function of that individual line 13, e.g. in an logarithmic scale. In addition, step 77 may retrieve line measurement date in the form of Quiet Line Noise (QLN) data that describe the noise on a transmission line 13 of the vectoring group when that line 13 is not carrying a data signal. In case the method 51 is executed on the monitoring station 39, the data Hlog, QLN may be retrieved from at least one of the nodes 17, 19 connected to the telecommunication lines 13, preferably from the access node 17, by means of a communication protocol such as SNMP.

Then a step 95 determines a noise level metric $N_{dist}$ for at least one line 13, with the noise level metric $N_{dist}$ depending on the noise level at the at least one telecommunication line. The method 51 described herein can be applied with any suitable type of noise level metric. However, the exemplary embodiment described herein uses a metric referred to as "number of disturbers $N_{dist}$" described in detail in the published patent application EP 2 383 899 A1. Basically, the number of disturber metric Ndist is determined by fitting a mathematical model for the far end crosstalk (FEXT) to the data Hlog, QLN acquired in step 77 by optimising the parameter $N_{dist}$ of the mathematical model. The parameter $N_{dist}$ describes a number of disturbing users. The optimum value of the parameter $N_{dist}$ obtained by this curve fitting approach corresponds to the noise level metric determined in step 95. Details on how to determine the data Hlog and QLN in step 77 and how to calculate the metric $N_{dist}$ in step 95 are described in the above-mentioned patent application. Furthermore, the metric $N_{dist}$ may be computed using further collected parameters, e.g. bit rate, noise margin, output power, actual Impulse Noise Protection (INP) expressed as a number of Discrete Multi-Tone (DMT) symbols, actual delay.

The Method 51 has a branch 97 executed after the line noise level metric $N_{dist}$ has been calculated in step 95, which branch 97 compares the noise level metric $N_{dist}$ with a noise level threshold $N_{th}$. If the noise level metric $N_{dist}$ is greater than the noise level threshold $N_{th}$ (Y) then the method 51 performs a step 99 in order to determine or signal that alien crosstalk has been detected. Otherwise (N) step 99 is skipped. Step 99 is the last step of the method 51. That is, after step 99 the method 51 is terminated in step 101.

It should be noted that the noise level metric $N_{dist}$ is related to both in-domain crosstalk and alien crosstalk. It is thus not possible to separate these two kinds of crosstalk by analysing that noise level metric $N_{dist}$ only. However, the previously executed steps of the method 51 operate with the residual crosstalk metric $\alpha_a$ that reflects the crosstalk within the vectoring group only (i.e. only in-domain crosstalk). If the method 51 reaches branch 97 and is not terminated in step 89 then it is known that the in-domain crosstalk has been cancelled to a sufficient extent. If the overall noise on a telecommunication line 13 is still too high, e.g. higher than the noise threshold $N_{th}$, then it can be concluded that the origin of that noise is not crosstalk within the vectoring group but alien crosstalk. As a consequence, the method 51 described herein does not only allow for optimizing the parameter v but also serves to detect alien crosstalk.

To sum up, the method described herein basically compares a residual crosstalk with a target or optimal residual crosstalk. If the crosstalk is too high, the parameter v will be decremented until the optimal or target residual crosstalk is reached. If the residual crosstalk is very low, the parameter v will be incremented until the optimal or target residual crosstalk is reached. Once the optimal or target residual crosstalk is reached, the noise level metric $N_{dist}$ that represents the noise which surrounds the line and the residual crosstalk after vectoring processing is performed. Knowing that the majority of residual crosstalk is cancelled, the noise level metric $N_{dist}$ is dominated by the alien crosstalk. Thus, alien crosstalk can be detected and diagnosed if the value of the noise level metric is too high.

The invention claimed is:

1. Method for determining a parameter that characterizes a number of spare positions to be used for cancelling the crosstalk of lines joining a digital subscriber line vectoring group, the vectoring comprising cancelling the crosstalk caused by a maximum number of lines of the vectoring group and reserving said number of spare positions, wherein the method comprises
   determining at least one residual crosstalk metric that depends on a residual crosstalk between at least two subscriber lines of the vectoring group, wherein the residual crosstalk metric includes at least one crosstalk ratio of a certain line, the crosstalk ratio corresponding to a ratio of the crosstalk caused by the lines of the vectoring group that are not included in crosstalk cancellation to the crosstalk caused by all lines of the vectoring group; and
   determining said parameter that characterizes the number of spare positions depending on the at least one residual crosstalk metric by successively modifying the number of spare positions until the residual crosstalk metric fulfils a termination condition,
   wherein the method comprises checking whether or not the residual crosstalk metric is less than a predefined residual crosstalk threshold and depending on the result of said checking either successively incrementing the parameter until the residual crosstalk metric fulfils a first predefined termination condition or successively decrementing the parameter until the residual crosstalk metric fulfils a second predefined termination condition.

2. Method according to claim 1, wherein the crosstalk metric is a maximum value or a mean value of the crosstalk ratio of multiple lines of the vectoring group, preferably of all lines of the vectoring group.

3. Method according to claim 1, wherein the method comprises determining a noise level metric for at least one line, the noise level metric depending on the noise level at the at least one line.

4. Method according to claim 3, wherein the method comprises detecting that the at least on subscriber line is subject to alien crosstalk depending on the noise level metric, preferably if the noise level metric is greater than a predefined noise level threshold.

5. Method according to claim 1, wherein the method comprises acquiring line measurement data from at least one termination device connected to one of the telecommunication lines and calculating the noise level metric depending on the acquired line measurement data.

6. A non-transitory computer readable storage medium, comprising a computer program that is programmed for executing a method according to claim 1 when run on a computer.

7. Device for determining a parameter that characterizes a number of spare positions to be used for cancelling the crosstalk of lines joining a digital subscriber line vectoring group, the vectoring comprising cancelling the crosstalk caused by a maximum number of lines of the vectoring group and reserving said number of spare positions, wherein the device is arranged for
   determining at least one residual crosstalk metric that depends on a residual crosstalk between at least two subscriber lines of the vectoring group, wherein the residual crosstalk metric includes at least one crosstalk ratio of a certain line, the crosstalk ratio corresponding to a ratio of the crosstalk caused by the lines of the vectoring group that are not included in crosstalk cancellation to the crosstalk caused by all lines of the vectoring group; and
   determining said parameter that characterizes the number of spare positions depending on the at least one residual crosstalk metric by successively modifying the number of spare positions until the residual crosstalk metric fulfils a termination condition,
   wherein the device checks whether or not the residual crosstalk metric is less than a predefined residual crosstalk threshold and depending on the result of said checking either successively incrementing the parameter until the residual crosstalk metric fulfils a first predefined termination condition or successively decrementing the parameter until the residual crosstalk metric fulfils a second predefined termination condition.

8. Monitoring node comprising a communication interface for connecting the monitoring node to a network, the network including at least one device connected to at least one telecommunication line of a digital subscriber line vectoring group, wherein the monitoring node comprises a device according to claim 7.

9. Access node, preferably a DSLAM, the access node comprising a device according to one of claim 7.

* * * * *